United States Patent Office 2,902,504
Patented Sept. 1, 1959

2,902,504
PROCESS FOR PREPARING ARYLCHLOROSILANES

Siegfried Nitzsche and Rudolf Riedle, Burghausen, Oberbayern, Germany, assignors to Wacker Chemie G.m.b.H., Munich, Germany No Drawing. Application December 1, 1955
Serial No. 550,503

Claims priority, application Germany December 7, 1954

3 Claims. (Cl. 260—448.2)

This invention relates to a novel method of preparing arylchlorosilanes.

Arylchlorosilanes have been known for a number of years and are particularly useful intermediates in the preparation of organosiloxane resins. The arylchlorosilanes are, therefore, commercially significant and are important as raw materials in the organosiloxane industry. An inexpensive commercially feasible method of producing arylchlorosilanes has long been sought. They have been synthesized from silicon tetrachloride by using a Grignard reagent such as aryl magnesium bromide. Another means of synthesizing arylchlorosilanes is by the Wurtz reaction whereby chlorobenzene is reacted with silicon tetrachloride and metallic sodium. These methods have been proven inadequate because the product obtained is a mixture of arylchlorosilanes and tetra-arylsilanes. This, of course, reduces the yield of the desired product and requires a relatively difficult separation procedure which adds to the expense of the final product.

Other suggested methods of preparing arylchlorosilanes include reacting aryl halides with silicon; and passing a mixture of chlorobenzene and HCl over silicon activated copper or copper salts at high temperatures. These methods are also unsatisfactory because of the low yield obtained. For example, when chlorobenzene and HCl are passed over a silicon-copper alloy containing 10% by weight of copper at a temperature of 540° C. the yield of phenyltrichlorosilane is 5.9% based on the weight of the reactants, and it is only 8.1% based on the total reaction product.

Another method of producing aryltrichlorosilanes is the reaction of silicochloroform with aromatic hydrocarbons. However, since silicochloroform has a low boiling point the suggested method must be carried out at high pressure. High pressure reactions require expensive equipment and are unduly expensive both in terms of money and in terms of time because batch operation rather than continuous operation is generally necessary.

It has been suggested that the addition of catalysts such as Ansolvo acids, peroxides or azo compounds to the reaction mixture of silicochloroform and aromatic hydrocarbon would result in a higher yield of the desired product. However, these suggested catalysts also attack the aryltrichlorosilane as it is formed, thereby reducing the yield of the desired product. Thus the yield of the product obtained by this last suggested method is totally unsatisfactory.

Other suggested methods for the synthesis of aryltrichlorosilane require the use of precious metal catalysts such as palladium. The use of such precious metals is of little commercial significance because of the expense involved and because of the short life of such catalysts.

Surprisingly it was found that arylchlorosilanes, especially aryltrichloro- and arylmethyldichlorosilanes, can be produced on a commercial scale, with good yield, at relatively low cost, by reacting any aryl chloride with a chlorohydrogensilane containing at least one hydrogen atom attached to each silicon atom, said reaction being carried out in vapor phase at a temperature of 400° to 700° C., employing a surface active copper catalyst.

The aryl chlorides which are operative in this invention are compounds in which at least one chlorine atom is bonded directly to an aromatic nucleus and which are not subject to excessive thermal decomposition below 400° C. Illustrative of the aryl chlorides operative herein are monochlorobenzene, trichlorobenzene, dichlorotoluene, chloroxylenes and chloronaphthalenes.

The chlorosilanes operative herein can be exemplified by the formula $R_nH_mSiCl_{4-m-n}$, wherein R is any monovalent hydrocarbon radical, $n$ has an average value of 0–2, $m$ has an average value of 1 to 3, and $m+n$ does not exceed 3. Examples of the chlorosilanes operative herein include silicochloroform, methyldichlorosilane ($CH_3SiHCl_2$), dimethylchlorosilane, phenyldichlorosilane and ethylmethylchlorosilane.

The copper catalyst employed in this invention can vary within wide limits insofar as its chemical and physical form is concerned. The copper should be surface active (i.e. the surface of the copper should be effective for the reaction and not poisoned), and it should have a large surface area. It can be in the form of a copper powder, a copper salt precipitated on another powder such as pumice, or the copper salts themselves can be used provided the surface area is sufficiently large and the surface is chemically active.

Copper alloys can also be used. When copper alloys are employed, the other base metals employed are not catalytically active but they may serve to bind the HCl formed in the reaction. Such alloys which have been found useful in this invention include alloys of copper with iron, magnesium, zinc, calcium, aluminum, silicon, cobalt, nickel and silver.

An excellent copper catalyst can be readily prepared by treating a copper alloy such as Messing (Cu and Zn), Arnd's alloy (Cu, Mg), German silver (Cu, Zn and Ni) or Devard's alloy (Cu, Al and Zn), with HCl gas at a high temperature. The baser metal reacts with the HCl to form a chloride and the copper is activated and remains as a highly porous, surface active catalyst.

The instant inventive reaction can be carried out at atmospheric pressure. Pressures up to 10 pounds per square inch above atmospheric and pressures somewhat below atmospheric can also be employed without departing from the scope of this invention.

Since the HCl split out during the inventive reaction again attacks the formed Si-C linkage at the high reaction temperatures and thus decreases the attainable yield, it is desirable to add to the catalyst mass substances which react with the HCl and in this way remove it from the vapor mixture. The addition of metallic silicon has proved very advantageous. It reacts with HCl forming $SiCl_4$ and silicochloroform. The $SiCl_4$ has no effect on the reaction; the silicochloroform can react further and thus contribute to raising the yield. The silicon can be added as a physical mixture with the copper catalyst and also as copper-silicon alloy. Naturally other metallic additives are also suitable for reacting with the HCl; however the resultant chlorides must not have a disadvantageous effect on the arylhalosilane formed.

The inventive reaction can be carried out over a large temperature range; it starts at approximately 400° C. and even at 700° C. still gives considerable yields. The most favorable range has proved to be 450–600° C., especially a temperature in the neighborhod of about 500° C. At such temperature, e.g., a mixture of chlorobenzene and silicochloroform is converted to phenyltrichlorosilane in good yields. To be sure, an increase in the reaction temperature accelerates the formation of the arylchlorosilane, but at the same time it increases the formation of undesired by-products.

The following examples will aid those skilled in the art to better understand and practice this invention. The examples are not intended to limit the scope of the invention which is properly delineated in the claims.

Example 1

300 g. of copper oxalate were moistened with water and placed on 500 g. granulated pumice. The blue-green mass was placed in an inclined iron tube of 40 mm. inside diameter, which was heated to 400° C. by electrical resistance heating. A gentle stream of hydrogen was passed through the tube until all the water was driven off and the copper was reduced to the metal. The pumice granules became coated with a layer of red copper. The catalyst filled tube was heated to 560° C. and during the course of 20 hours, a mixture of 750 g. chlorobenzene and 450 g. silicochloroform, corresponding to a mol ratio of 2:1, was dripped into the upper end and the reaction mixture leaving the lower end of the tube was condensed and collected. The total condensate was then fractionally distilled in a highly efficient packed column. There was obtained 108 g. $HSiCl_3$ (B.P. 30–35° C.), 205 g. $SiCl_4$ (B.P. 54–58° C.), 83 g. benzene (B.P. 78–82° C.), 510 g. chlorobenzene (B.P. 128–132° C.) and finally 104 g. phenyltrichlorosilane (B.P. 70–82° C. at a pressure of 11 mm.). The conversion amounted to 8.7%. After recovery of the unreacted silicochloroform and chlorobenzene, the yield was 18%, based on the weight of the products.

Example 2

In an inclined, externally heated iron tube of 40 mm. inside diameter, 1 g. of a finely powdered silicon copper alloy containing 10% copper was heated to 540° C. First a dry stream of HCl was passed for 15 minutes over the alloy in order to activate it. Then for 17.2 hours a mixture of chlorobenzene and silicochloroform in the mol ratio 2:1 was dripped into the upper end at the rate of about 70 g./hour. Thereafter the collected reaction product was distilled in a column. The product obtained was distilled and separated (in the boiling ranges of Example 1): 183 g. phenyltrichlorosilane, 143 g. silicochloroform, 128 g. $SiCl_4$, 456 g. chlorobenzene and 86 g. benzene. This corresponds to a conversion of 15% by weight and a yield of 30% by weight.

Example 3

Hydrated copper oxide was precipitated from a copper salt solution onto granulated activated charcoal. The resultant product was placed in a heated iron tube and heated to 500° C. in a stream of hydrozen until the mass was dry and all the copper oxide had been reduced. 650 g. of this catalyst mass was heated to 500° C. and 6 mols of chlorobenzene and 2 mols of methyldichlorosilane ($CH_3HSiCl_2$), i.e. 1057 g. mixture, were added dropwise over 22 hours. The resultant reaction product was fractionally distilled. In addition to $SiCl_4$, dimethyldichlorosilane and methyltrichlorosilane, which were formed by disproportionation, as well as benzene, one obtains also: 38 g. methyldichlorosilane, 325 g. chlorobenzene and 57 g. of a fraction boiling at 100-120° C./40 mm. The latter is a mixture of phenyltrichlorosilane and phenylmethyldichlorosilane, which because of their small difference in boiling point can be separated only with difficulty. Analysis of the product gives the values shown under (*a*). The corresponding values for pure phenyltrichlorosilane are given under (*b*) and those for pure phenylmethyldichlorosilane under (*c*):

|  | Density at 25° C. | Percent Cl |
| --- | --- | --- |
| (*a*) | 1.244 | 44.2 |
| (*b*) | 1.312 | 50.4 |
| (*c*) | 1.167 | 37.2 |

From this the composition of the distillate can be calculated as 54% phenyltrichlorosilane and 46% phenylmethyldichlorosilane.

Example 4

1.2 kg. of a copper-silicon alloy were heated to 350° C. in an electrically heated iron tube and a strong stream of HCl was passed therethrough. After 10 hours the majority of the silicon had been removed as silicochloroform and $SiCl_4$. Thereafter the temperature was raised to 480° C. and during the course of 12 hours, a mixture of 896 g. chlorobenzene and 270 g. silicochloroform, corresponding to a mol ratio of 4:1 was vaporized and passed therethrough. Fractionation of the reaction product yielded 123 g. phenyltrichlorosilane, 93 g. $HSiCl_3$, 48 g. $SiCl_4$, 147 g. benzene and 597 g. chlorobenzene. This corresponds to a conversion of 10.5% and a yield of 26%, based on the weight of the reacted chlorobenzene and silicochloroform.

Example 5

A vertically placed tubular oven of 20 cm. diameter and 40 cm. filling height was loaded with a finely powdered mixture of 10 kg. of technical metallic silicon and 10 kg. of anhydrous copper-I-chloride. At a temperature of about 200° C. the reduction of the copper salt to copper sets in under violent evolving of silicon tetrachloride. After that the oven is heated to 500 °C. and a vaporous mixture of 18.75 kg. of chlorobenzene and 11.25 kg. silicochloroform is introduced from below during a period of 30 hours. This corresponds to an introduction rate of 1 kg./hour and a molar proportion of the reactants of chlorobenzene:silicochloroform=2:1. The evolving reaction gases are condensed in a brine condenser. The total condensate is subjected to a fractionated distillation, whereupon there are obtained, besides 6.98 kg. silicochloroform and 14.7 kg. chlorobenzene, 3.25 kg. phenyltrichlorosilane (B.P. 80 to 90° C./15 mm.). The extent of conversion is 10.8%. Based on the weight of the consumed reactants, the yield is 36.5%; based on the consumed chlorobenzene, it is 42.7% of the theoretical amount.

Example 6

20 kg. of a finely powdered copper-silicon alloy with a copper content of 40% are placed into the same oven as in Example 5. The oven is heated to 220° C. and a stream of 800 g. dry gaseous hydrogen chloride per hour is introduced; the evolving silicochloroform is condensed in the receiver. After about 30 kg. of hydrogen chloride have been passed through, no more silicochloroform is formed, i.e. the silicon content of the alloy is consumed. In the oven there is now a dark- to light-red, highly active copper powder. The temperature is now raised to 540° C. and for a period of 30 hours a vapor mixture of 208 g. chlorobenzene and 125 g. silicochloroform per hour is passed through, which makes a total amount of 10 kg. 9.2 kg. of condensate are obtained which, on fractionating, give, besides 1.5 kg. silicochloroform and 2.8 kg. chlorobenzene, 2.12 kg. phenyltrichlorosilane. This corresponds to a conversion of 21.2% and a yield of 37.2%, based on the weight of the consumed silicochloroform and chlorobenzene; calculated on the consumed silicochloroform, the yield is 60% of theory.

Example 7

In a spacious, fireproof pot 50 g. of aluminum gravel and 250 g. of anhydrous cuprous chloride are mixed and slowly heated. Reaction takes place under violent conflagration and evolving of aluminum chloride vapors. Several such mixtures are milled together in a ball mill under the exclusion of air, and then 1 kg. of this mass is placed into the inclined tube of Example 1. The oven is heated to 600° C. and nitrogen is passed through until no more aluminum chloride evolves. Then for 12 hours a mixture of 375 g. chlorobenzene and 225 g. silicochloroform is dripped into the tube. The reaction mixture appearing at the lower end of the tube is completely condensed by means of a freezing mixture and the condensate is fractionated, whereby there are obtained, besides 50 g. silicochloroform and 235 g. chlorobenzene, 79 g. phenyltrichlorosilane. This corresponds to a conversion of 13.2% by weight and a yield of 25.3% by weight; the degree of utilization of the consumed phenyl radicals is 30% of theory.

*Example 8*

In a vertically placed tubular oven of 20 cm. diameter and 40 cm. filling height a finely powdered mixture of 15 kg. copper-I-chloride and 6 kg. pure metallic silicon with a Si content of more than 98% is slowly heated under agitation. After the violent formation of silicon tetrachloride is finished the oven is heated to 530° C. and then for 50 hours a constant stream of a vaporous mixture of 16.9 kg. chlorobenzene and 13.5 kg. silicochloroform, corresponding to a molar proportion of 1:5:1.10, is passed through under further agitation. Upon fractionated distillation of the condensate there are obtained, besides 6.12 kg. silicochloroform and 8.54 kg. chlorobenzene, 6.7 kg. phenyltrichlorosilane. This corresponds to a conversion of 22% by weight and a yield of 42.3% by weight; based on the phenyl radicals, the yield is 41.8% of theory.

The proportion of aryl chlorides and chlorosilane according to the invention is not critical. It depends solely on economic factors. The component which is present in an excess amount acts as a diluting agent. Since in most cases the chlorosilane will be more expensive than the chlorobenzene, the experiments have been carried out with an excess of chlorobenzene. If one wishes to know the yield based on the phenyl radicals, the reaction can also be carried out using an excess of chlorosilane, whereby the phenyl yield will rise and the yield based on the chlorosilane correspondingly decreases. For this reason the yield given in the examples is always based on the consumed total amount of chlorobenzene plus silane.

It has also been generally proposed to pass halohydrocarbons in admixture with chlorosilanes under heating over mixtures of metals. As metals there have been suggested on the one hand single metals such as copper, aluminum, iron or nickel, and on the other hand metallic silicon. This process, however, can only be used for reacting halo-alkyls and brominated aromates. For preparing phenyltrichlorosilane, for instance, bromobenzene must be used. Under the stated operating conditions, chlorobenzene does not react at all. For an economically feasible synthesis, however, the use of bromobenzene is out of question, for it is approximately ten times as expensive as chlorobenzene.

That which is claimed is:

1. Method of preparing arylchlorosilanes comprising passing gaseous mixtures of aryl chlorides which contain a chlorine atom attached directly to the aromatic nucleus, and chlorosilanes which have at least one Si-bonded hydrogen atom at a temperature in the range of 450° to 600° C. over surface active copper catalyst prepared by heating copper chlorides with a metal selected from the group consisting of iron, aluminum, zinc, magnesium and silicon.

2. Method of preparing arylchlorosilanes comprising passing gaseous mixtures of aryl chlorides which contain a chlorine atom directly attached to the aromatic nucleus, and chlorosilanes which have at least one Si-bonded hydrogen atom at a temperature of 450°–600° C., over surface active copper prepared by depositing a decomposable copper compound selected from the group consisting of copper salts, copper hydroxide and copper oxide on an inactive carrier and reducing said copper compound and activating the copper in a hydrogen stream.

3. Method of preparing arylchlorosilanes comprising passing gaseous mixtures of aryl chlorides which contain a chlorine atom directly attached to the aromatic nucleus, and chlorosilanes which have at least one Si-bonded hydrogen, at a temperature of 450°–600° C., over surface active copper prepared by treating a copper alloyed with a metal selected from the group consisting of Fe, Cl, Zn, Mg, and Si, with hydrogen chloride at a temperature above 150° C., whereby the alloy component is removed and a surface active copper is obtained.

References Cited in the file of this patent

UNITED STATES PATENTS

| | | |
|---|---|---|
| 2,380,997 | Patnode | Aug. 7, 1945 |
| 2,483,373 | Rochow | Sept. 27, 1949 |
| 2,598,436 | Mohler et al. | May 27, 1952 |
| 2,657,114 | Wagner | Oct. 27, 1953 |
| 2,759,960 | Nishikawa et al. | Aug. 21, 1956 |

UNITED STATES PATENT OFFICE
CERTIFICATE OF CORRECTION

Patent No. 2,902,504                                                                           September 1, 1959

Siegfried Nitzsche et al.

It is hereby certified that error appears in the printed specification of the above numbered patent requiring correction and that the said Letters Patent should read as corrected below.

Column 3, line 33, for "1 g." read -- 1 kg. --; line 51, for "hydrozen" read -- hydrogen --; column 4, line 25, after "copper-I-chloride." insert the following sentence -- The oven was slowly heated while displacing the air therein by nitrogen. --; column 5, line 20, for "1:5:1.10," read -- 1.5:1.0, --.

Signed and sealed this 1st day of March 1960.

(SEAL)
Attest:

KARL H. AXLINE                                                  ROBERT C. WATSON

Attesting Officer                                            Commissioner of Patents